United States Patent [19]

Grubbs

[11] 4,435,749

[45] Mar. 6, 1984

[54] HIGH FREQUENCY INVERTER FAULT PROTECTION SYSTEM

[75] Inventor: Calvin E. Grubbs, Garland, Tex.

[73] Assignee: Thomas Industries Inc., Louisville, Ky.

[21] Appl. No.: 352,955

[22] Filed: Feb. 26, 1982

[51] Int. Cl.³ .............................................. H02H 7/122
[52] U.S. Cl. ..................................................... 363/58
[58] Field of Search ................................... 363/57, 58

[56] References Cited

U.S. PATENT DOCUMENTS 4,200,830  4/1980  Oughton et al. ................. 363/57 X
4,210,846  7/1980  Capewell et al. .

*Primary Examiner*—William M. Shoop
*Attorney, Agent, or Firm*—Emrich, Lee, Brown & Hill

[57] ABSTRACT

A fault protection system for a balanced thyristor capacitor/inverter half-bridge which generates a high frequency oscillating voltage from full-wave rectified line voltage is disclosed. Following the detection of thyristor over-current and the removal of transformer-coupled, alternating, gated drive signals from the thyristors by means of logic and control circuitry, the natural ringing of a charged resonant circuit coupled across the inverter half-bridge causes thyristor commutation and inverter shutdown. The resonant circuit and inverter half-bridge are isolated from the line voltage source during the fault recovery cycle by means of an inductance, the size of which is selected to greatly exceed the total inductance in the inverter bridge-resonant circuit system to avoid saturation until the power thyristors have been given sufficient time to turn off. Thyristor minimum commutation voltage is provided by a low voltage power supply coupled to the inverter half-bridge via the isolation inductance and which is energized by an output transformer coupled to the inverter half-bridge.

7 Claims, 2 Drawing Figures

HIGH FREQUENCY INVERTER FAULT PROTECTION SYSTEM

CROSS-REFERENCE TO RELATED APPLICATION

The present invention is related to my co-pending, co-owned U.S. patent application Ser. No. 194,783, entitled "SOLID STATE BALLAST," file Oct. 7, 1980, the disclosure of which is expressly incorporated herein by reference.

BACKGROUND OF THE INVENTION

The present invention relates generally to high frequency inverters and is specifically directed toward a fault protection system for a thyristor/capacitor inverter half-bridge.

There are many applications requiring the conversion of conventional 60 Hz line power into a high frequency signal for energizing an output device. One application is in the field of gaseous discharge lamps, such as fluorescent lamps, and high-intensity discharge (HID) lamps. These devices operate much more efficiently at frequencies on the order of 15-20 KHz, or higher, rather than the power input line frequencies of 60 or 120 Hz.

Despite the economic incentive to energize gas discharge lamps with a higher frequency, and even though many solid state ballast circuits have been proposed in the literature and are otherwise known, there has been no solid state ballast circuit which has gained widespread commercial acceptance. There are perhaps many facors which have contributed to the lack of a commercial solid state, high-frequency ballast or inverter for gaseous discharge lamps, among which are the low initial cost of conventional ballasts due to the large volume and efficient production techniques which are employed, thereby at least partially offsetting any reduction in operating costs by reducing the initial outlay. Further, from a technical standpoint, when solid state ballasts were first developed, the power switches that were available for operating at the frequency and current levels required, were either too expensive or not reliable enough. Many of these problems have now been overcome due to advances in technology, and further, the increased cost of energy has emphasized the need for reducing operating costs over the long term.

Manufacturers are, however, still faced with problems. Among such problems is the need to provide protection for the various faults which may occur in a solid state ballast, such as excessive current or voltage in the thyristor power circuit, lamp over-voltage, loss of primary power, lamp failure, and so on.

Considering the various applications, such as fluorescent lamps, low and high pressure sodium, and metal halides, if a separate solid state ballast is required for each such application, and each ballast must include not only the numerous fault protection mechanisms, but also regulate lamp current during normal operation, provide for automatic start up and re-strike during the period between cusps of primary power when oscillation may be extinguished, it can be seen that a solid state ballast capable of widespread application would be extremely desirable. Moreover, the availability of such a ballast would permit those involved in the development of various types of new systems using a particular ballast to shorten development time and lower development costs through the availability of greater knowledge of and experience with the particular ballast.

U.S. patent application Ser. No. 194,783, referenced above, describes a solid state, high-frequency ballast or inverter for energizing a lamp circuit with a high frequency oscillating voltage derived from full-wave rectified line voltage. The ballast includes a thyristor/capacitor inverter bridge the output of which is regulated by a variable delay circuit which is synchronized with the zero crossing of the thyristor current. The solid state ballast includes an initialization circuit for lamp warm-up, a re-strike circuit for re-start when the rectified line voltage falls below that which is necessary to sustain oscillation of the inverter, and fault detection circuits including a thyristor over-current detection circuit.

In the thyristor over-current protection circuit provision is made for sequentially commutating both power thyristors to the off-state when the current through the series-connected thyristors exceeds a predetermined value, as when both thyristors conduct simultaneously (thyristor fault). Thyristor shutdown following the detection of a fault and the removal of the drive pulses from the thyristors is accomplished by gating ON a third thyristor which couples a capacitor having a stored charge between the junction of the thyristors and circuit ground. The charge stored on the capacitor is used to produce a reverse polarity terminal voltage across the poer thyristors which, in turn, sequentially shut off. After the first thyristor shuts off, the natural oscillation of the circuit commutates and the second power thyristor also turns off.

This system requires the use of sophisticated logic and control circuitry for processing the thyristor over-current control signal and initiating the gating ON of the third, or commutating, thyristor. In addition, the charge stored on the capacitor is depleted during one recovery cycle to the extent that if the fault condition persists and as capacitor charge is depleted, recovery becomes impossible and damage to the thyristors may result. This system also uses more circuit components and dissipates more electrical energy then the improved circuit disclosed herein.

SUMMARY OF THE INVENTION

The present invention is intended to overcome the aforementioned limitations and therefore represents an improvement over the prior art.

Briefly, the present invention has application to a thyristor/capacitor inverter bridge which converts a full-wave rectified line voltage to a high frequency alternating voltage. The thyristors are gated ON by means of the alternately pulsed outputs of a pulse transformer with the frequency of oscillation determined primarily by the resonance of the inverter bridge capacitors and the inductance of the output transformer.

A fault detection circuit detects thyristor over-current and provides a shutdown signal to logic and control circuitry resulting in the removal of the thyristor gate drive pulses from the primary of the pulse transformer. A resonant circuit consisting of a DC filter capacitor, faulted thyristors and series inductors causes a natural ringing and commutates off the power thyristors. The resonant circuit and inverter bridge are isolated from the line voltage source during the recovery cycle by means of an inductance. The isolation inductance is sized to be very much larger (greater than ten times and preferably about one hundred times greater) than the total inductance in the power thyristor circuit and it is designed so as to preclude saturation until the power thyristors have been given enough time to turn off. Minimum commutation voltage is provided during the inter-cusp periods of the full-wave rectified line voltage by coupling a lower voltage power supply to the inverter bridge via the isolation inductance. Power dissipation in the inverter circuit is substantially reduced by preventing circulating current in the inverter circuit from flowing in the fault detection circuit.

BRIEF DESCRIPTION OF THE DRAWINGS

The appended claims set forth those novel features believed characteristic of the invention. However, the invention itself as well as further objects and advantages thereof will best be understood by reference to the following detailed description of a preferred embodiment taken in conjunction with the accompanying drawings in which:

DETAILED DESCRIPTION OF THE PREFERRED EMBODIMENTS

Figure 1:
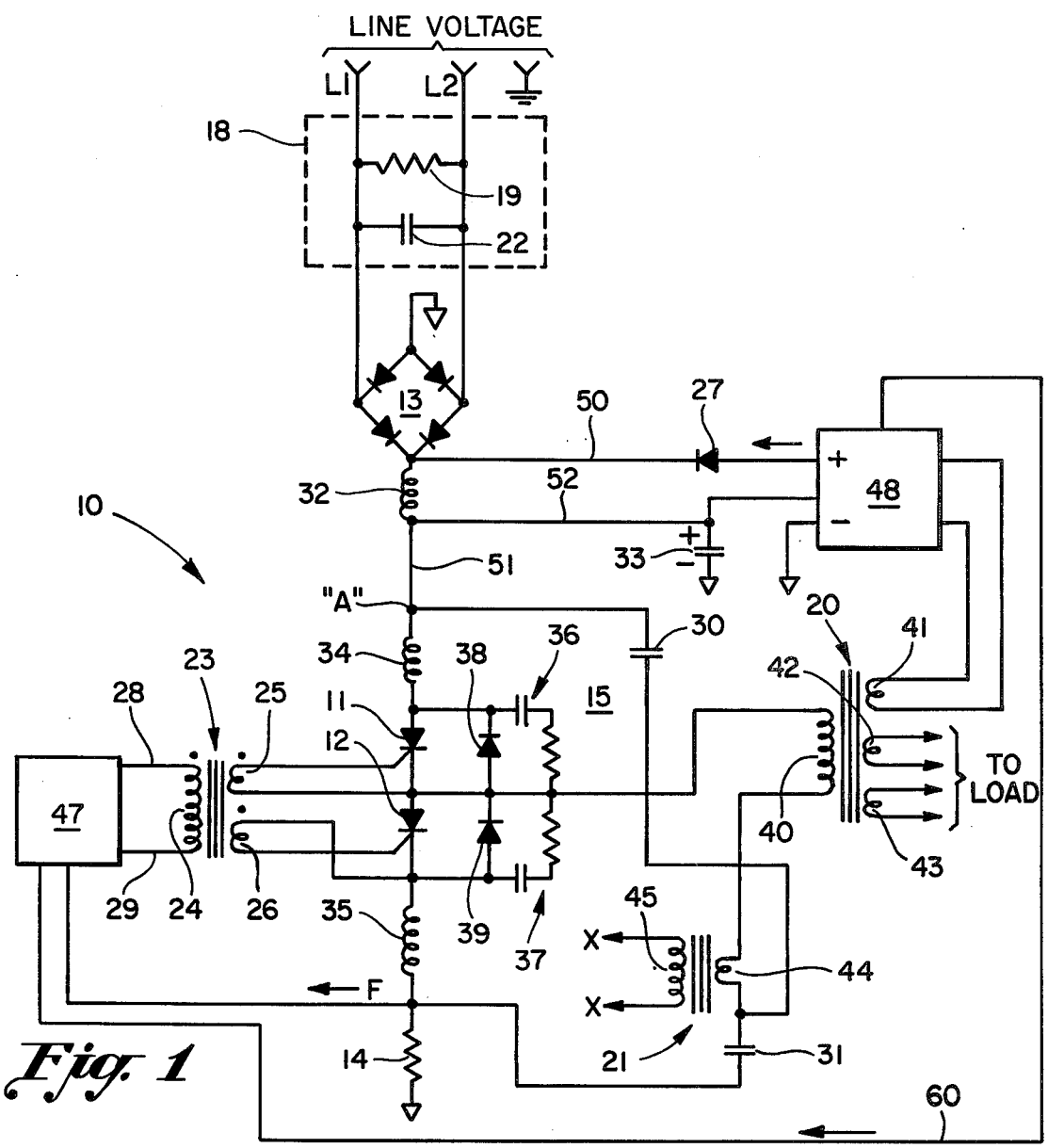
FIG. 1 shows the high frequency inverter fault protection system of the present invention partially in block diagram form and partially in schematic diagram form.

Referring to FIG. 1, a preferred embodiment of the high frequency inverter fault protection system 10 of the present invention is shown. A 60 Hz line voltage is connected to lines L1 and L2 respectively with the input terminal coupled to neutral ground potential. The input power is then provided to a conventional EMI filter 18 which is comprised of resistor 19 and capacitor 22 coupled across input lines L1 and L2. The output of the EMI filter 18 is fed to opposite diagonal nodes of the full-wave rectifier bridge circuit 13. The output voltage of the rectifier bridge circuit 13 is connected to inductance 32. The opposite diagonal node of the full-wave rectifier circuit 13 is coupled to the circuit common (hereinafter referred to as ground, although it is not necessarily a ground for the input line). The junction of inductance 32 and the output of rectifier circuit 13 is coupled by means of a diode 27 and line 50 to a low voltage power supply 48. The other terminal of inductance 32 is coupled by means of line 51 to an inverter circuit generally designated 15 and to logic ground potential by means of line 52 to which a grounded capacitor 33 is coupled.

The inverter circuit 15 includes a pair of power thyristors 11, 12 and capacitors 30, 31 connected in a bridge circuit configuration. Output power is derived from transformer 20 connected in the diagonal branch of this inverter bridge. While the present invention is disclosed primarily in terms of an inverter half-bridge, it is not limited in its application to this type of circuit but will operate equally as well with a full bridge inverter circuit. Thus, in the present disclosure the terms inverter bridge and inverter half-bridge are used interchangeably. Similarly, while the present invention is described as being energized by a 60 Hz line signal, it is not limited in operation to an input signal of this frequency by may, in fact, be energized by a much higher frequency signal or a very low frequency signal, including a DC input signal.

Reactance diodes 38, 39 are connected respectively across the power thyristors 11, 12 in opposite polarity to limit inverse voltage across the thyristors. Series resistance/capacitance circuits 36, 37 are respectively connected across thyristors 11, 12 and commutating diodes 38, 39 to limit the rate of change of voltage. Such circuits are known in the art, being commonly referred to as "snubber" circuits. Inductances 34, 35 are placed in series with the thyristors 11, 12 to limit the rate of change of current through them and their associated reactance diodes.

The thyristors 11, 12 are gated by a signal coupled through a pulse transformer generally designated 23. The transformer 23 includes a primary winding 24 energized by the logic and control circuitry of the system generally included within the block 47, and first and second secondary windings 25, 26 which are connected in the circuit respectively with the gate leads of thyristors 11, 12 in such a manner that current flowing through primary winding 24 in one polarity will cause thyristor 11 to conduct, and current flowing through primary winding 24 in the opposite polarity will cause thyristor 12 to conduct.

The low voltage supply circuit 48 draws power from the output of the rectifier bridge circuit 13 for energizing the logic and control circuit 47 via line 60. The configuration and operation of the lower voltage power supply 48 and the logic and control circuit 47 does not form a part of the present invention and is therefore not decribed in detail herein. A low voltage power supply circuit and logic and control circuitry with which the present invention is compatible are disclosed in my co-pending U.S. patent application Ser. No. 194,783, identified above. The disclosure of said application, Ser. No. 194,783, is hereby incorporated by reference in the instant application as the present invention represents improvements over that system. The present invention, however, is not limited to operating with the low voltage power supply and logic and control circuitry specifically described in the referenced co-pending application, but is compatible with any such systems having the same basic interface performance characteristics.

Gated pulses from the logic and control circuit 47 are sequentially provided via lines 28 and 29 to the primary winding 24 of transformer 23. These pulsed inputs cause current to pass through primary winding 24 in alternating directions resulting in pulsed gate signals being provided sequentially to secondary windings 25, 26. These gate signals, in turn, cause thyristors 11, 12 to conduct in sequence. The output from logic and control circuit 47 to primary winding 24 is coupled following a delay after each zero cross-over of the thyristor current to a different thyristor. This delay is variable in length but always is greater than the turn off time of the thyristors so that they can be commutated off before a new cycle begins. The generation of the timing signal which provides for this will be explained presently.

When thyristor 11 conducts, thyristor 12 is non-conducting, and capacitor 30 discharges through thyristor 11 and the primary winding 40 of power transformer 20 (from the positive to the negative terminal). At this time capacitor 31 charges through the conducting thyristor. The capacitors 30, 31 form a tuned circuit with the inductance of the transformer 20 so that the resulting current is sinusoidal in nature.

In the next succeeding cycle, logic and control circuit 47 causes the current through the primary winding 24 of transformer 23 to be reversed so that thyristor 12 conducts. This reverses the current through power transformer 20. In this manner, oscillation is sustained in the inverter circuit. In this sense, the word "inverter" is used to mean that the full-wave rectified bridge circuit 13 output (120 half-sinusoidal cusps per second) is converterd to a much higher frequency signal, which may be on the order of 20-25 KHz, or higher.

In the preferred embodiment of the present invention, the alternating output of the inverter bridge 15 is provided to the primary winding 40 of power transformer 20 which possesses a relatively high output impedance for load current limiting purposes. In the present invention it is not essential that the output of inverter bridge 15 be provided to a power transformer as the output therefrom could be provided directly to the load device. The primary winding 40 of power transformer 20 is connected between the diagonal nodes of the inverter bridge 15 comprised of power thyristors 11, 12 and balanced capacitors 30, 31 described previously. Power transformer 20 includes a plurality of secondary windings. Several secondary windings such as 42, 43 provide the high frequency AC output to the load (or loads). In addition, a third secondary winding 41 energizes a low voltage power supply 48 which, in turn, energizes the logic and control circuit 47.

A winding 44, which is a primary winding of transformer 21, is connected in series with the primary 40 of the power transformer 20 in order to generate the timing and phase signals on the lines XX coupled to its secondary 45. The signal provided to lines XX is coupled to the logic and control circuit 47 for detecting the zero cross-over of the thyristor currents. Capacitor 31 couples the primary winding 44 of transformer 21 to the junction of inductance 35 and grounded resistor 14. A signal denoted F is the voltage across resistor 14 picked off at the junction of inductance 35 and resistor 14 which is representative of the instantaneous value of the high frequency inverter current passing through a thyristor (and through both thyristors in the event of a short-circuit fault). The inverter current sensing signal F is then provided to logic and control circuit 47 which, in the case of thyristor over-current, removes the pulsed drive signals from transformer 23 thus turning off thyristors 11, 12. By coupling the primary winding 44 of transformer 21 to the junction of inductance 35 and resistor 14 by means of capacitor 31, the circulating current flowing in resistor 14 is kept to a minimum. This reduces the power dissipation across resistor 14 making the high frequency inverter fault protection system 10 of the present invention more energy-efficient.

The low voltage supply circuit 48 draws power from the output of rectifier bridge 13 on line 52 for energizing the logic and control circuitry 47 prior to the oscillation of the inverter. Once inverter oscillation is initiated, the low voltage power supply 48 is energized by the alternating output of secondary coil 41 of power transformer 20 which is rectified in the low voltage power supply 48 for logic and control circuit operation during inverter oscillation. The purpose of first coupling the output of rectifier circuit 13 and then the output of secondary winding 41 of power transformer 20 to the low voltage power supply is to reduce the power consumption theren, while permitting the generation of a low voltage supply when the system is switched on.

An output of the low voltage supply 48 is coupled to the junction of rectifier bridge circuit 13 and inductance 22 by line 50. During the inter-cusp period of the full-wave rectified output of rectifier circuit 13, the output of rectifier bridge 13 reduced to a point where the load driven by power transformer 20 may not conduct. By thus providing an input from low voltage power supply 48, the amplitude of the signal provided to bridge circuit 15 is sufficient during the entire rectified full-wave cycle to maintain inverter oscillation due to the transfer of power via diode 27. The present invention is not limited to the aforementioned method of maintaining inverter oscillation during the entire rectified full-wave cycle. However, the approach described herein provides for the generation of a low voltage while maintaining the power factor of the system.

A resonant circuit is included in the inverter half-bridge circuit 15 which rings in an oscillating state so as to sequentially commutate thyristors 11 and 12 to the OFF, or non-conducting, state. Thus, the present invention does not require the storing of energy and the timed release of this energy upon fault detection for thyristor commutation, but rather takes advantage of the inherent characteristics of a resonant circuit included in the inverter half-bridge circuit 15 for directing the energy stored therein to effect thyristor commutation in the event of inverter fault detection.

Thyristor over-current due to either thyristor shorting, both thyristors conducting or the circuit being unloaded is detected as an over-voltage across resistor 14 whereupon a fault signal F is provided to the logic and control circuitry 47 for removing the drive pulses from transformer 23.

In a fault condition thyristors 11, 12 are conducting with an inverter fault signal F provided to the logic and control circuit 47. Capacitor 33 in combination with inductances 34 and 35 form a resonant circuit. With thyristors 11, 12 conducting, capacitor 33 discharges into thyristors 11, 12 until the energy stored in capacitor 33 is transferred to inductances 34, 35. At this point in time, the current in the resonant circuit reverses and the energy stored in inductances 34, 35 is then transferred back to and stored in capacitor 33. During the recharging of capacitor 33, current flows from the grounded terminal of capacitor 33 through the commutating diodes 38, 39 of bridge circuit 15 and back into the positive terminal of capacitor 33. This reverse current causes a negative voltage to be developed across thyristors 11, 12 from anode to cathode. During the application of this voltage reversal across thyristors 11, 12, the stored carriers at the junctions in each thyristor are rapidly removed by internal recombination and by the sweeping effect of the reverse current. When the carriers have been removed, thyristors 11, 12 revert to a blocking condition in which only a low leakage current flows.

Figure 2:
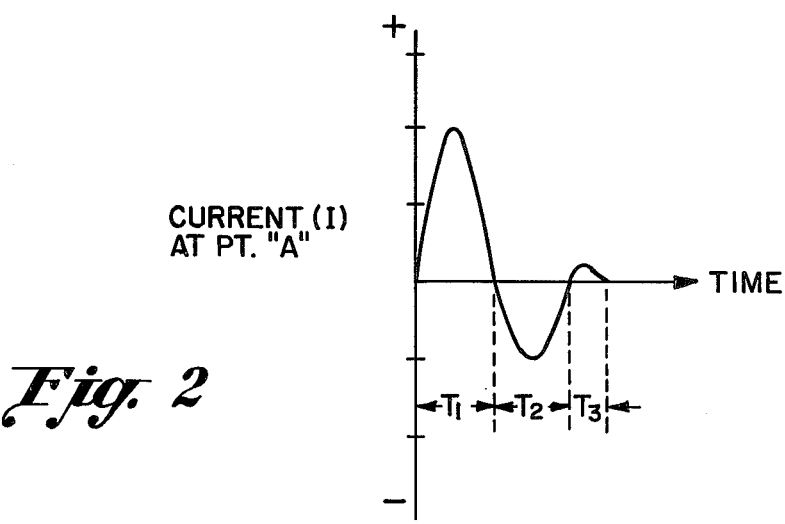
FIG. 2 shows the change in magnitude and direction of current in the inverter bridge circuit following removal of the gated drive pulses from the power thyristors.

The flow of current through power thyristors 11, 12 during a fault cycle is illustrated in FIG. 2. Shown is the current at point "A" in the high frequency inverter fault protection system 10. Following the removal of gated drive pulses from thyristors 11, 12 upon the detection of a fault therein, a large forward current is provided through the power thyristors by the discharge of capacitor 33 during the time interval $T_1$. When the energy stored in capacitor 33 has been transferred to inductances 34, 35, the current through the inverter bridge 15 will be reversed and flow from the grounded terminal of capacitor 33 through diodes 38, 39 and back into the positive terminal of capacitor 33. This occurs during the time interval $T_2$. During $T_2$ the stored charge in thyristors 11, 12 is swept out causing the commutation of the power thyristors to the OFF, or non-conducting, state. Following T₂, the subsequent discharge of capacitor 33 will transfer energy to the inductance 34 during T₃ with thyristors 11, 12 remaining OFF. The resonant circuit comprised of capacitor 33 and inductances 34, 35 and included in the inverter bridge circuit 15 rings in a natural oscillating state to effect the commutation of the power thyristors. The present invention thus provides for the automatic turn-off of a high frequency inverter circuit following fault detection. The circuit can then be subsequently automatically activated following a predetermined timer period, or the occurrence of some other designated event, by merely re-initiating the pulsed drive inputs to power thyristors 11, 12 doing away with the need to manually re-set the inverter following a fault-initiated shutdown.

The recharging of capacitor 33 by means of the reverse current through bridge circuit 15 is made possible by inductance 32 which couples the output of bridge circuit 13 to capacitor 33 and bridge circuit 15. In order for capacitor 33 to discharge and be re-charged through bridge circuit 13, inductance 32 must isolate the resonant circuit of capacitor 33 and inductances 34, 35 such that large currents from the line source are not provided to capacitor 33 during the discharge and recharging of capacitor 33 through inductances 34, 35. In order for inductance 32 to provide proper isolation between the line source and the power thyristors during the fault commutation cycle previously described, the inductance value of inductor 32 must be large relative to the sum of the inductances of inductors 34 and 35. This enables the ringing effect of the fault commutation current shown in FIG. 2, and as described, while the current in inductor 32 remains substantially constant. Secondly, the design of inductor 32 and its core must be such that it will not saturate during the ringing of the fault commutation current. This may be specified by the volt-seconds rating of inductor 32. If the inductor 32 does saturate, it would permit high current to flow from the line voltage source through the shorted thyristors and prevent their commutation. Thus, inductance 32 must be sufficiently large so as to isolate capacitor 33 from the line voltage source in permitting it to charge and discharge by means of bridge circit 15 and inductances 34, 35 on each side thereof during a fault condition.

Another way to look at the thyristor commutation circuit following the removal of drive pulses from thyristors 11, 12 is to consider two coupled resonant circuits. The first resonant circuit is comprised of capacitor 33 and inductance 32. The second resonant circuit is comprised of capacitor 33 and inductances 34, 35. In order for capacitor 33 to charge and discharge through bridge circuit 15, the resonant frequency of capacitor 33 and inductance 32 must be much lower than the resonant frequency of capacitor 33 and inductances 34, 35 in circuit. In this situation, the rate of change of current in the first resonant circuit will be inversely proportional to the value of inductance 32. Thus, it can be seen that by selecting the value of inductance 32 to be sufficiently large relative to inductances 34, 35 and by insuring that inductance 32 will not saturate during the shorter ringing period of fault correction, the commutation of thyristors 11, 12 is ensured by the higher frequency ringing of the second resonant circuit comprised of capacitor 33 and inductances 34, 35.

There has thus been provided a high frequency inverter fault protection system in which coupled thyristors in the inverter bridge circuit are commutated following fault detection and the removal of gate pulses therefrom by means of a resonant circuit. The natural ringing of the resonant circuit, which is isolated from the line voltage input, releases energy stored in the inverter circuit to effect thyristor commutation in turning off and automatically resetting the inverter circuit for turn-on upon receipt of the gated pulses.

While particular embodiments of the present invention have been shown and described, it will be apparent to those skilled in the art that changes and modifications may be made therein without departing from the invention in its broader aspects. The aim of the appended claims, therefore, is to cover all such changes and modifications as fall within the true spirit and scope of the invention.

I claim:

1. In an inverter circuit including first and second control switching means connected in separate branches of a bridge circuit and energized by a line source and driven by gating signals from control logic means to conduct respectively in alternate half cycles to sustain oscillation and provide an inverter signal, said control logic means providing said gating signals to said first and second control switching means in timed relation with said inverter signal, said bridge circuit further including first and second balanced capacitors connected in separate branches of said bridge circuit and power transformer means connected in the diagonal branch of said bridge circuit and including a plurality of secondary windings, each coupled to an output device with at least one of said secondary windings coupled to a direct current power supply for energizing said control logic means, the frequency of oscillation of said inverter signal being determined by the capacitance of said first and second capacitors, the inductance of said power transformer means and a time delay provided by said control logic means, a fault protection system comprising:

detector circuit means including a resistor coupled to said control switching means and responsive to the current therein for disabling said control logic means when said control switching means current exceeds a predetermined value;

first resonant circuit means including first and second inductances and a capacitor connected in circuit with said first and second control switching means and said line source wherein the discharging and charging of said capacitor across said inverter circuit commutates said first and second control switching means to a non-conducting state following the disabling of said control logic means by said detector circuit means and wherein said first inductance is coupled to said first control switching means and said second inductance couples said second control switching means to said detector circuit means; and conducting means coupling said line source to said control switching means and said first resonant circuit means for providing circuit isolation therebetween such that the resonant frequency of said first resonant circuit means is much greater than the charging rate of said capacitor by said line source and wherein said direct current power supply is coupled to the junction of said line source and said conducting means for continuously providing at least a predetermined minimum voltage across said first and second control switching means for turning off said first and second control switching means following the disabling of said control logic means.

2. In an inverter circuit including first and second control switching means connected in separate branches of a bridge circuit and energized by a line source and driven by gating signals from control logic means to conduct respectively in alternate half cycles to sustain oscillation and provide an inverter signal, said control logic means providing said gating signals to said first and second control switching means in timed relation with said inverter signal, said bridge circuit further including second and third balanced capacitors connected in separate branches of said bridge circuit and power transformer means connected in the diagonal branch of said bridge circuit and including a plurality of secondary windings, each coupled to an output device with at least one of said secondary windings coupled to a direct current power supply for energizing said control logic means, the frequency of oscillation of said inverter signal being determined by the capacitance of said second and third capacitors, the inductance of said power transformer means and a time delay provided by said control logic means, a fault protection system comprising:
 a synchronization transformer including:
  a primary winding coupled in circuit with a primary winding of said power transformer means and said first and second control switching means; and
  a secondary winding coupled in circuit with said control logic means in providing inverter current phase information thereto;
 detector circuit means including a resistor responsive to the current in said control switching means for disabling said control logic means when said control switching means current exceeds a predetermined value;
 first resonant circuit means including first and second inductances and a capacitor connected in circuit with said first and second control switching means and said line source wherein the discharging and charging of said capacitor across said inverter circuit commutates said first and second control switching means to a non-conducting state following the disabling of said control logic means by said detector circuit means and wherein said first inductance is coupled to said first control switching means and said second inductance couples said second control switching means to said detector circuit means; and
 conducting means coupling said line source to said control switching means and said first resonant circuit means for providing circuit isolation therebetween such that the resonant frequency of said first resonant circuit means is much greater than the charging rate of said capacitor by said line source.

3. The system of claim 2 wherein the primary winding of said synchronization transformer means is coupled to said detector circuit means in detecting zero crossover current therein.

4. In an inverter circuit for providing an inverter signal including first and second coupled control switching means and capacitors connected in respective branches of a balanced bridge circuit, with said first and second control switching means energized by a line source and driven by gating signals from control logic means so as to conduct in alternate half cycles of said inverter signal to sustain oscillation, said control logic means providing said gating signals to said first and second control switching means in timed relation with said inverter signal, and including power transformer means connected in the diagonal branch of said bridge circuit for energizing an output device, the frequency of oscillation of said inverter signal being determined by the capacitance of said first and second capacitors and the inductance of said power transformer means and a time delay provided by said control logic means, a fault protection system comprising:
 detector circuit means responsive to the current in said control switching means for disabling said control logic means when the current in said control switching means exceeds a predetermined value, said detector circuit means including a resistor connecting said first and second coupled control switching means to ground potential;
 resonant circuit means including a capacitor connected in circuit with said first and second control switching means and said line source wherein the discharging and charging of said capacitor across said inverter circuit commutates said first and second control switching means to a non-conducting state following the disabling of said control logic means by said detector circuit means;
 conducting means coupling said line source to said first and second control switching means and to said resonant circuit means in providing circuit isolation therebetween such that the resonant frequency of said resonant circuit means is much greater than the charging rate of said capacitor by said line source; and
 synchronization transformer means including:
  a primary winding coupling a primary winding of said power transformer means to said detector circuit means in detecting zero crossover current therein; and
  a secondary winding inductively coupled to said primary winding and connected to said control logic means in providing inverter current phase information thereto.

5. In an inverter circuit receiving power from a line source and generating a high frequency inverter signal for energizing power transformer means in driving an output device, said inverter circuit including: first and second control switching means and capacitors connected in respective branches of a balanced bridge circuit with said power transformer means connected in the diagonal branch of said bridge circuit; driver circuit means for triggering said first and second control switching means to conduct in alternate half cycles of said inverter signal to sustain oscillation; first detector circuit means responsive to signals in said output device for generating a timing signal in timed relation with said inverter signal; current sensor circuit means for generating a current sensor signal representative of the magnitude of current flowing in said output device; control circuit means responsive to said timing signal and said current sensor signal for actuating said driver circuit means to trigger said first and second control switching means in predetermined time relation with said inverter signal to regulate the current in said output device; second resistive detector circuit means responsive to the current in said first and second control switching means and coupled to said control circuit means for disabling said driver circuit means when the current in said first and second control switching means exceeds a predetermined value; and resonant circuit means coupled to said balanced bridge circuit for commutating said first and second control switching means off when said driver circuit is disabled, the improvement comprising:

means for coupling said power transformer means to said second resistive detector circuit means for reducing inverter circuit power dissipation.

6. The circuit of claim 5 wherein said power transformer means is coupled to said second resistive detector circuit means by means of said first detector circuit means.

7. The circuit of claim 6 wherein said first detector circuit means includes a synchronization transformer having a primary winding coupling said power transformer means to said second resistive detector circuit means and wherein said second resistive detector circuit means includes a resistor with the voltage across said resistor representing the current in said first and second control switching means.

* * * * *